United States Patent [19]

Sifniades

[11] 3,761,510

[45] Sept. 25, 1973

[54] PROCESS FOR PREPARING ALKYL NITROACETATES AND INTERMEDIATES THEREFOR

[75] Inventor: Stylianos Sifniades, Parsippany, N.J.

[73] Assignee: Allied Chemical Corporation, New York, N.Y.

[22] Filed: June 2, 1971

[21] Appl. No.: 149,344

[52] U.S. Cl. ............. 260/478, 260/307 G, 260/483, 260/561 R
[51] Int. Cl. ............................................ C07c 79/42
[58] Field of Search ................................... 260/478

[56] References Cited
UNITED STATES PATENTS
2,528,928   11/1950   Weisblat et al. .................... 260/478
2,791,604   5/1957   Blackwood et al. ................. 260/478
3,305,567   2/1967   Houle et al. ......................... 260/478

OTHER PUBLICATIONS

Bouveault et al. Bull. Soc. Chim. France, Vol. 31(1904), pp. 847–854.
Arndt et al. J. Chem. Soc. (1935), pp. 1–10.

*Primary Examiner*—James A. Patten
*Attorney*—Arthur J. Plantamura

[57] ABSTRACT

Improved process for preparing alkyl nitroacetates by reaction of an acyl nitrate and an alkyl acetoacetate in the presence of an acid catalyst at low temperatures to form an alkyl nitroacetoacetate intermediate which can be cleaved with a nucleophile to form an alkyl nitroacetate.

32 Claims, No Drawings

PROCESS FOR PREPARING ALKYL NITROACETATES AND INTERMEDIATES THEREFOR

This invention relates to an improved process for preparing alkyl nitroacetates. More particularly, this invention relates to a process for preparing alkyl nitroacetates by nitration of an alkyl acetoacetate with an acyl nitrate to form an intermediate alkyl nitroacetoacetate and cleavage of this intermediate.

BACKGROUND OF THE INVENTION

Alkyl nitroacetates are known compounds useful in the preparation of α-nitro acids by reaction with alkyl halides, aldehydes, tertiary amines and the like. These α-nitro acids can be employed in the preparation of amino acids, such as phenylalanine and tryptophane, on hydrogenation. Several methods are known to prepare alkyl nitroacetates, but none of them has proven commercially successful due to their high costs.

DISCUSSION OF THE PRIOR ART

U.S. Pat. No. 3,026,352 discloses the preparation of ethyl nitroacetate by self condensation of 2 mols of nitromethane in the presence of 4 mols of potassium hydroxide to form the dipotassium salt of nitroacetic acid followed by acidification and esterification.

Finkbeiner et al. have disclosed in J. Org. Chem. 28, 215–217 (1963) a process whereby nitromethane is treated with an excess of magnesium methyl carbonate to form the magnesium chelate of nitroacetic acid followed by esterification with a strong acid.

Kornblum et al. reported in J. Am. Chem. Soc. 77, 6654-5 (1955) that they prepared ethyl nitroacetate by reacting ethyl iodoacetate with silver nitrite.

Relatively high yields of the desired alkyl nitroacetate are prepared by these methods, but they are not suitable as a commercial route to formation of these compounds due to the high cost of starting materials such as potassium hydroxide, magnesium and silver.

Another route was disclosed by early researchers Bouveault and Wahl, Bull. Soc. Chim. France, 31, 847–54 (1904), whereby ethyl acetoacetate was reacted with absolute nitric acid in acetic anhydride at 30°–35° C., but low yields of ethyl nitroacetate were reported. This work was later confirmed by Arndt and Rose in J. Chem. Soc. 1935, 1–10. The major product produced using the conditions of Bouveault and Wahl was found to be diethyl-2-oxofurazan dicarboxylate.

SUMMARY OF THE INVENTION

It is an object of the present invention to provide an improved process for preparing alkyl nitroacetates in high yields.

It is another object to provide a process for preparing alkyl nitroacetates using inexpensive starting materials.

It is a further object to improve the yields of alkyl nitroacetates obtained by reaction of alkyl acetoacetates with acyl nitrates.

Further objects will become apparent from the following detailed description thereof.

It has been discovered that when alkyl acetoacetates are reacted with acyl nitrates at low temperatures and in the presence of an acidic catalyst, high yields of nitroacetoacetates are obtained which can be readily cleaved by addition of a nucleophile to form alkyl nitroacetates.

DETAILED DESCRIPTION OF THE INVENTION

Acyl nitrates are readily prepared by adding nitric acid to an anhydride of a lower carboxylic acid. Anhydrides of carboxylic acids of up to six carbon atoms are suitable, such as acetic anhydride, propionic anhydride, butyric anhydride, hexanoic anhydride and the like. Acetic anhydride is readily available and is preferred. Nitric acid can be added in concentrated form (99%) or as the standard 70% aqueous solution. At least an equimolar amount of the carboxylic acid anhydride is required but generally an excess, up to 10 mols, is added to take up any water present or formed during the reaction.

Other methods for preparing acyl nitrates are known, such as by reacting a carboxylic acid anhydride with dinitrogen pentoxide or by reacting an acyl peroxide with dinitrogen tetroxide.

Alkyl acetoacetates suitable for use in the invention have the formula $CH_3COCH_2COOR$ wherein R is an alkyl or cycloalkyl group of one to 18 carbon atoms, preferably one to 12 carbon atoms, including methyl acetoacetate, ethyl acetoacetate, isopropyl acetoacetate, dodecanoyl acetoacetate, stearyl acetoacetate, cyclohexyl acetoacetate and the like.

The presence of an acidic catalyst is required to prevent the formation of large amounts of dialkyl-2-oxofurazan dicarboxylate which greatly decreases the yield of the desired alkyl nitroacetates. Suitable catalysts include strong inorganic acids, such as perchloric acid and sulfuric acid; strong organic acids such as p-toluene sulfonic acid and methane sulfonic acid; and Lewis acids such as boron trifluoride, antimony pentafluoride, phosphorus pentafluoride, titanium tetrafluoride, tellurium hexafluoride and tin tetrafluoride. Sulfonic acid cationic exchange resins can also be employed. Several of these resins are commercially available, such as Dowex 50W-X8 of Dow Chemical Co., Amberlite IR120 of Rohm & Haas Co., Permutit Q of Permutit Co., Nalcite HCR of National Aluminate Co. and Ionac C-240 of American Zeolite Co. Processes for making sulfonic acid resins are described in U.S. Pat. Nos. 2,366,007 and 2,466,675. Weak acids, such as acetic acid and trifluoroacetic acid, are unsuitable as catalysts. In the absence of a suitable acid catalyst, diminished reactivity requires higher reaction temperatures, which greatly increases the formation of dialkyl-2-oxofurazan dicarboxylates. However, when too much catalyst is present, the yield of alkyl nitroacetoacetate is also adversely affected. At least 0.01 mol % of the alkyl acetoacetate of an acid catalyst should be present, up to about 10 mol %. The preferred catalytic amounts are from about 0.2 to about 1.0 mol % based on the alkyl acetoacetate starting material. However, in the case of the cationic exchange resins, much greater amounts of the catalyst can be present, on the order of from about 1 to about 800 mol % based on the alkyl acetoacetate. Preferably from about 5 to 100 mol % will be employed.

The reaction can be carried out in the presence of an anhydrous diluent if desired. Suitable diluents should be miscible with the reactants and the products and can be lower organic acids such as acetic acid, propionic acid and the like; alkyl ethers such as diethyl ether, methyl ethyl ether and the like; esters such as methyl acetate, ethyl acetate and the like; halogenated solvents such as chloroform, carbon tetrachloride, ethylene dichloride and the like. An excess of the carboxylic acid anhydride employed to prepare the acyl nitrate can also be employed and is preferred.

The formation of high yields of alkyl nitroacetoacetates according to the present process is temperature dependent and must be carried out at low temperatures. At higher temperatures, increased amounts of dialkyl-2-oxofurazan dicarboxylates and other undesired by-products are formed. Thus a combination of both a suitable acid catalyst and low reaction temperature is required to minimize formation of the undesired dicarboxylate. For example, when acidic catalysts such as perchloric acid, sulfuric acid or boron trifluoride are present, good reaction rates and high yields of alkyl nitroacetoacetates are obtained at $-10°C$. When a weaker acid is present, such as trifluoroacetic acid, temperatures of $15°-20°C$. are required, with a concomitant increase in the amount of dicarboxylate formed. In general the temperature of reaction should be maintained below about $25°C$., preferably below about $10°C$., although the reaction mixture should be maintained in liquid phase.

The alkyl nitroacetoacetate product can be isolated from the reaction mixture by removing the acid catalyst and fractionally distilling below about $120°C$., preferably below about $100°C$.

When a cationic exchange resin is employed as catalyst, it can be removed by filtering or decanting and reserved for recycle. In a continuous process, the reaction mixture can be passed through a fixed catalyst bed and the product mixture collected, as will be known to one skilled in the art.

Lewis acids do not require neutralization or removal. Other acid catalysts can be removed by neutralizing with a base. Since the alkyl nitroacetoacetates are unstable in the presence of water, the base should be in anhydrous form. Any strong inorganic base is suitable for the neutralization, such as the carbonates, oxides or hydroxides of the alkali or alkaline earth metals. Illustrative bases include sodium hydroxide, potassium hydroxide, calcium oxide, magnesium oxide, sodium carbonate and the like. A sufficient amount of base is added to neutralize the acid catalyst present. The water of neutralization can be taken up for example by excess carboxylic acid anhydride present in the reaction mixture.

Alkyl nitroacetoacetates are unstable in the presence of acids and condense to form dialkyl-2-oxofurazan dicarboxylates at temperatures above about $120°C$. They are highly reactive to nucleophiles such as water and the lower alcohols to form alkyl nitroacetates and acetic acid or its corresponding ester derivative. Basic nucleophiles, such as ammonia, primary and secondary amines, are also reactive with the alkyl nitroacetoacetates to form alkyl nitroacetates and the corresponding acetamides. Alkyl nitroacetoacetates are stable in the presence of tertiary amines, e.g. triethylamine.

When it is desired to isolate alkyl nitroacetates directly from the reaction mixture, without first isolating the alkyl nitroacetoacetates, a nucleophile can be added directly to the reaction mixture. This reaction can be carried out at ambient temperatures. The catalyst can be removed, if required, as discussed hereinbefore, before or after addition of the nucleophile. If an acid catalyst is neutralized after addition of a nucleophile, anhydrous conditions are not required. The desired alkyl nitroacetates are recovered by removing any volatile solvents present, as by flash distillation or evaporation, and fractionally distilling the product mixture at reduced pressures.

The present process provides methods of obtaining alkyl nitroacetoacetates or alkyl nitroacetates in high yields in a rapid and simple manner using inexpensive starting materials.

The invention will be further illustrated by the following examples, but it is to be understood that the invention is not meant to be limited to the details described therein. In the examples % is by weight.

EXAMPLE 1

Part A-Colorless 99% nitric acid (44 ml., 1.05 mols) was added to acetic anhydride (200 ml., 2.10 mols) dropwise over 8 minutes maintaining the temperature at $0°-5°C$. After 5 minutes the mixture was cooled to $-15°C$. and ethyl acetoacetate (130 g, 1.00 mol) was added over 5 minutes. A solution of perchloric acid (0.20 ml., 0.002 mol) in 4 ml. of acetic acid was stirred in over a 10 minute period so as to maintain the reaction mixture below $-10°C$.

After one hour, 98% of the ethyl acetoacetate had reacted. The product was ethyl nitroacetoacetate as determined by vapor phase chromatographic (hereinafter GC) analysis, only a trace of diethyl-2-oxofurazan dicarboxylate having formed.

Part B-Ethanol (250 ml., 4.30 mols) was added and the temperature allowed to rise to $30°C$. After 60 minutes, all of the ethyl nitroacetoacetate had been cleaved to ethyl nitroacetate by GC analysis.

The perchloric acid was neutralized with anhydrous sodium carbonate (0.21 g) and the reaction mixture evaporated at $40°C$. under vacuum in a rotary evaporator.

The residue was fractionally distilled. The major cut distilled at $70°C./1.5$ mm Hg. Ethyl nitroacetate was recovered in 94% yield (122.5 g, 0.92 mol) at 98% conversion of ethylacetoacetate. The structure was confirmed by GC and infrared (hereinafter IR) analyses.

EXAMPLE 2

Part A-A mixture of 70% nitric acid (13 ml., 0.20 mol) and 98% sulfuric acid (0.10 ml, 0.002 mol) was added to acetic anhydride (114 ml., 1.20 mols) dropwise at $15°-20°C$. The mixture was cooled to $-10°C$. and ethyl acetoacetate (26 ml, 0.20 mol) added dropwise over 10 minutes, maintaining the temperature at about $-10°C$. After standing for 1 hour and 40 minutes at $-10°C$., 94% of the ethyl acetoacetate had reacted.

The product was a mixture of ethyl nitroacetoacetate and diethyl-2-oxofurazan dicarboxylate in a weight ratio of 30:1, as determined by GC analysis.

Part B-The reaction mixture was treated with anhydrous sodium carbonate (0.21 gram, 0.002 mol) at $-10°C$. A 10 ml. aliquot of the resultant mixture was treated to flash distillation and the oily residue fractionally distilled under vacuum. The fraction distilling at $90°-95°C./2$ mm Hg was collected and confirmed as ethyl nitroacetoacetate by IR and nuclear magnetic resonance analyses which were consistent with the structure for $CH_3COCHNO_2COOC_2H_5$ with about 25% in the enol form.

The remainder of the reaction mixture was treated with 100 ml. of water and stirred for 20 minutes at about $16°C$. The resultant mixture was treated twice with chloroform (100 ml and 50 ml respectively) and the organic layer flashed off. The product was a bright yellow liquid (17.4 grams) containing 89% ethyl nitroacetate and 10% unreacted ethyl acetoacetate. This corresponds to a yield of 68% at about 90% conversion of ethyl acetoacetate.

EXAMPLES 3-5

The procedure of Example 2, Part A, was followed using different catalysts. Procedures and results are summarized in Table I below:

TABLE I

| Example | Catalyst | Mol percent catalyst based on EAA[1] | Temperature, °C. | Time, min.[2] | Conversion, percent based on EAA | Ratio ENAA[3] to DEOF[4] |
|---|---|---|---|---|---|---|
| 3 | Toluene sulfonic acid. | 2.5 | −5 | 65 | 96 | 7.4. |
| 4 | Sulfonic acid ion. | 25 | −5 | 50 | 97 | No DEOF. |
| 5 | Boron trifluoride (in ether). | 1.0 | −10 | 35 | 98 | Only trace DEOF. |

[1] EAA=ethyl acetoacetate.
[2] Measured after addition of reagents complete.
[3] ENAA=ethyl nitroacetoacetate.
[4] DEOF=diethyl-2-oxofurazan dicarboxylate.
[5] Dowex 50W-X8 resin of Dow Chemical Co.

EXAMPLES 6-7

The procedure of Example 2, Part A, was followed except using 99% nitric acid and decreased amounts of acetic anhydride. Procedures and results are summarized in Table II below, wherein the symbols have the meanings of Table I above.

TABLE II

| Example | Catalyst | Mol percent catalyst based on EAA | Mol percent acetic anhydride based on EAA | Temperature, °C. | Time, Minutes | Conversion, percent based on EAA | Ratio ENAA to DEOF |
|---|---|---|---|---|---|---|---|
| 6 | Perchloric acid | 0.25 | 210 | −10 | 10 | 99 | 39 |
| 7 | Sulfuric acid | 1.0 | 200 | −10 | 20 | 96 | 11 |

EXAMPLE 8

The procedure of Example 2, Part A was followed except using 1.0 mol % (based on ethyl acetoacetate) of perchloric acid as the catalyst. 100% Conversion was noted by GC analysis after 10 minutes at −10°C. The ratio of ethyl nitroacetoacetate to diethyl-2-oxofurazan dicarboxylate was 29.

EXAMPLE 9

The procedure of Example 2, Part A was followed except using 5.0 mol % (based on ethyl acetoacetate) of sulfuric acid at −5°C. reaction temperature. After 5 minutes 90% conversion was noted by GC analysis and the ratio of ethyl nitroacetoacetate to diethyl-2-oxofurazan dicarboxylate was 2.

EXAMPLES 10-11

Product mixtures obtained by reaction of acetyl nitrate and ethyl acetoacetate as in the foregoing examples were treated with a nucleophile as in Example 2, Part B. The catalyst was removed by filtration in the case of the cationic exchange resin catalyst and with anhydrous sodium carbonate in the case of the other acid catalysts, volatile solvents evaporated and the resultant mixture fractionally distilled. Procedures and results are summarized in Table III below, wherein the symbols are the same as those given in Table I.

TABLE III

| Product mixture | Nucleophile | Mols nucleophile (based on ENAA) | Time, minutes | Conversion, percent based on ENAA | Yield, percent ANA[1] |
|---|---|---|---|---|---|
| Example: | | | | | |
| 3 | Methanol | 20.5 | 100 | 100 | 98 |
| 4 | Ethanol | 25.0 | 40 | 98 | 90 |
| 7 | do | 1.6 | 140 | 100 | 81 |
| 8 | do | 5.1 | 25 | 100 | 105 |

[1] ANA=alkyl nitroacetate.

EXAMPLES 13-15

The procedure of Example 2, Parts A and B was followed except using different starting materials and 0.25 mol %, based on the alkyl acetoacetate, of perchloric acid as catalyst. Data and results are summarized in Table IV below.

TABLE IV

| Example | Alkyl acetoacetate | Temperature, °C. | Conversion, percent based on alkyl acetoacetate | Yield of alkyl nitroacetoacetate, percent [1] | Boiling point °C. mm. Hg | Nucleophile | Mols | Yield of alkyl nitroacetate, percent [2] |
|---|---|---|---|---|---|---|---|---|
| 13 | Methyl acetoacetate | −5 | 100 | 60 | 75/0.5 | Methanol | 12 | 93 |
| 14 | Isopropyl acetoacetate | −10 | 93 | 93 | 66/0.1 | do | 7.5 | 100 |
| 15 | Cyclohexyl acetoacetate | −10 | 89 | 85 | 98/0.2 | do | 19 | 100 |

[1] Based on converted alkyl acetoacetate.
[2] Based on charged alkyl nitroacetoacetate.

EXAMPLE 16

This example is given for purposes of comparing the present process with a process omitting the catalyst.

70% Nitric acid (1.3 ml, 0.020 mol) was added dropwise to acetic anhydride (11.4 ml, 0.12 mol) at 0°–5°C. The mixture was stirred for 5 minutes and cooled to −10°C. Ethyl acetoacetate (2.6 ml, 0.020 mol) was added dropwise and the temperature allowed to rise to 1°C. No reaction was noted by GC analysis. The temperature was increased to 15°C. and after 40 minutes increased to 20°C. After 1 hour the reaction mixture was dark yellow and 95% of the ethyl acetoacetate had reacted.

The yield of ethyl nitroacetoacetate, as determined by GC analysis, was only about 39%. The product mixture also contained a substantial amount of diethyl-2-oxofurazan dicarboxylate and several unidentified by-products in small amounts.

I claim:

1. A process for preparing alkyl nitroacetoacetates which comprises reacting an alkyl acetoacetate and an acyl nitrate at temperatures below 25°C. in the presence of an acidic catalyst, selected from the group consisting of strong inorganic acids, strong organic acids, and Lewis acids, removing the catalyst and fractionally distilling below about 120°C. under vacuum to recover the alkyl nitroacetoacetate.

2. A process according to claim 1 wherein the alkyl group of the alkyl acetoacetate has from one to 18 carbon atoms.

3. A process according to claim 1 wherein the alkyl group of the acyl nitrate has from one to five carbon atoms.

4. A process according to claim 1 wherein the catalyst is perchloric acid or sulfuric acid.

5. A process according to claim 1 wherein the catalyst is a Lewis acid selected from the group consisting of boron trifluoride, antimony pentafluoride, phosphorus pentafluoride, titanium tetrafluoride, tellurium hexafluoride and tin tetrafluoride.

6. A process according to claim 1 wherein the catalyst is boron trifluoride.

7. A process according to claim 1 wherein the catalyst is a sulfonic acid cationic exchange resin.

8. A process according to claim 2 wherein the alkyl acetoacetate is ethyl acetoacetate.

9. A process according to claim 2 wherein the alkyl acetoacetate is methyl acetoacetate.

10. A process according to claim 2 wherein the alkyl acetoacetate is isopropyl acetoacetate.

11. A process according to claim 2 wherein the alkyl acetoacetate is cyclohexyl acetoacetate.

12. A process according to claim 3 wherein the acyl nitrate is acetyl nitrate.

13. A process for preparing alkyl nitroacetates which comprises reacting an alkyl acetoacetate and acetyl nitrate at temperatures below 25°C. in the presence of an acidic catalyst, selected from the group consisting of strong inorganic acids, strong organic acids, and Lewis acids, removing the catalyst, adding a nucleophile selected from the group consisting of water, lower alcohols, ammonia, primary amines, and secondary amines, and fractionally distilling the resultant mixture under vacuum to recover the alkyl nitroacetate.

14. A process according to claim 13 wherein the alkyl group has from 1 to 18 carbon atoms.

15. A process for preparing alkyl nitroacetates which comprises reacting an alkyl acetoacetate wherein the alkyl group has from one to 18 carbon atoms with acetyl nitrate at temperatures below about 10°C. in the presence of a sulfuric acid or perchloric acid catalyst, neutralizing the catalyst with an anhydrous base, adding a nucleophile selected from the group consisting of water, lower alcohols, ammonia, primary amines, and secondary amines, and fractionally distilling the resultant mixture under vacuum to recover the alkyl nitroacetate.

16. A process according to claim 15 wherein from 0.01 to 10 mols of perchloric or sulfuric acid catalyst is added, based on the mols of alkyl acetoacetate charged.

17. A process according to claim 16 wherein from 0.2 to about 1.0 mol of catalyst is added.

18. A process according to claim 15 wherein the alkyl acetoacetate is ethyl acetoacetate and the nucleophile is ethanol.

19. A process for preparing alkyl nitroacetates which comprises reacting an alkyl acetoacetate wherein the alkyl group has from one to 18 carbon atoms with acetyl nitrate at temperatures below about 10°C. in the presence of a sulfonic acid cationic exchange resin catalyst, filtering off the resin, adding a nucleophile selected from the group consisting of water, lower alcohols, ammonia, primary amines, and secondary amines, and fractionally distilling the resultant mixture under vacuum to recover the alkyl nitroacetate.

20. A process according to claim 19 wherein from 1 to 800 mols of resin is present, based on the mols of alkyl acetoacetate charged.

21. A process according to claim 19 wherein from 5 to 100 mols of the resin is present.

22. A process according to claim 19 wherein the alkyl acetoacetate is ethyl acetoacetate and the nucleophile is ethanol.

23. A process for preparing alkyl nitroacetates which comprises reacting an alkyl acetoacetate wherein the alkyl group has from one to 18 carbon atoms with acetyl nitrate at temperatures below about 10°C. in the presence of a sulfuric acid or perchloric acid catalyst, adding a nucleophile selected from the group consisting of water, lower alcohols, ammonia, primary amines, and secondary amines, neutralizing the catalyst with a base and fractionally distilling the resultant mixture under vacuum to recover the alkyl nitroacetate.

24. A process according to claim 23 wherein from 0.01 mol to 10 mols of catalyst is added, based on the mols of alkyl acetoacetate charged.

25. A process according to claim 24 wherein from 0.2 to about 1.0 mol of catalyst is added.

26. A process according to claim 23 wherein the alkyl acetoacetate is ethyl acetoacetate and the nucleophile is ethanol.

27. A process for preparing alkyl nitroacetates which comprises reacting an alkyl acetoacetate and acetyl nitrate at temperatures below about 10°C. in the presence of a Lewis acid selected from the group consisting of boron trifluoride, antimony pentafluoride, phosphorus pentafluoride, titanium tetrafluoride, tellurium hexafluoride and tin tetrafluoride, adding a nucleophile selected from the group consisting of water, lower alcohols, ammonia, primary amines, and secondary amines, and fractionally distilling the resultant mixture under vacuum to recover the alkyl nitroacetate.

28. A process according to claim 27 wherein the catalyst is boron trifluoride.

29. A process according to claim 28 wherein from 0.2 to about 1.0 mol of catalyst is added based on the mols of alkyl acetoacetate charged.

30. A process according to claim 28 wherein the alkyl acetoacetate is ethyl acetoacetate and the nucleophile is ethanol.

31. A process for preparing alkyl nitroacetoacetates which comprises reacting an alkyl acetoacetate and an acyl nitrate at temperatures below about 25°C. in the presence of an acidic catalyst selected from the group consisting of strong inorganic acids, strong organic acids, and Lewis acids, to produce alkyl nitroacetoacetate.

32. A process for preparing alkyl nitroacetates which comprises reacting an alkyl acetoacetate and acyl nitrate at temperatures below about 25°C. in the presence of an acidic catalyst selected from the group consisting of strong inorganic acids, strong organic acids, and Lewis acids to produce alkyl nitroacetoacetate and adding a nucleophile selected from the group consisting of water, lower alcohols, ammonia, primary amines, and secondary amines, to effect conversion of the alkyl nitroacetoacetate to alkyl nitroacetate.

* * * * *

UNITED STATES PATENT OFFICE
CERTIFICATE OF CORRECTION

Patent No. 3,761,510                     Dated September 25, 1973

Inventor(s) Stylianos Sifniades

It is certified that error appears in the above-identified patent and that said Letters Patent are hereby corrected as shown below:

Column 5, Table I, under column designated "Catalyst" after Example "4........Sulfonic acid ion" add -- exchange resin$^{(5)}$ --.

Column 5, Table I, at footnote $^5$, after "...Dow Chemical Co." add -- expressed as acid equivalent percent --.

Claims 16 and 21, second line of each, "mols" should be -- mol percent --.

Claims 17, 25 and 29, second line of each, "mol" should be -- mol percent --.

Claim 20, column 8, line 54, "mols" (first occurrence) should be -- mol percent --.

Claim 24, column 9, line 4, delete "mol" and "mols" should be -- mol percent --.

Signed and sealed this 11th day of February 1975.

(SEAL)
Attest:

RUTH C. MASON
Attesting Officer

C. MARSHALL DANN
Commissioner of Patents
and Trademarks